US005693742A

United States Patent [19]
White et al.

[11] Patent Number: 5,693,742
[45] Date of Patent: Dec. 2, 1997

[54] SOLVENTLESS METHOD FOR MAKING POLYARYLENE ETHERS

[75] Inventors: Dwain Montgomery White; Margaret Louise Blohm, both of Schenectady; David Winfield Woodruff, Clifton Park; Sterling Bruce Brown, Schenectady, all of N.Y.

[73] Assignee: General Electric Company, Schenectady, N.Y.

[21] Appl. No.: 522,165

[22] Filed: Sep. 15, 1995

Related U.S. Application Data

[63] Continuation-in-part of Ser. No. 347,743, Dec. 1, 1994, abandoned.

[51] Int. Cl.$^6$ .................................................. C08G 65/44

[52] U.S. Cl. ........................ 528/212; 528/215; 528/216

[58] Field of Search ................................ 528/212, 215, 528/216

[56] References Cited

U.S. PATENT DOCUMENTS

| | | | |
|---|---|---|---|
| 3,306,875 | 2/1967 | Hay | 528/215 |
| 4,028,341 | 6/1977 | Hay | 528/215 |

*Primary Examiner*—Shelley A. Dodson
*Attorney, Agent, or Firm*—William H. Pittman

[57] ABSTRACT

A method for making polyarylene ethers comprises the step of melt polymerizing phenolic monomers in the presence of oxygen and oxidative coupling catalysts without employing environmentally unfriendly solvents.

14 Claims, No Drawings

SOLVENTLESS METHOD FOR MAKING POLYARYLENE ETHERS

This application is a continuation in part of U.S. Ser. No. 08/347,743, filed Dec. 1, 1994, entitled "Method for Making Polyarylene Ethers" now abandoned.

FIELD OF THE INVENTION

This invention relates to a novel method for making polyarylene ethers. More particularly, the instant invention is directed to a method for making polyphenylene ethers by melt polymerizing phenols in the presence of an oxidative coupling catalyst without employing environmentally unfriendly solvents.

BACKGROUND OF THE INVENTION

Polyphenylene ethers (PPE) as well as blends prepared therefrom constitute an invaluable class of engineering thermoplastic resins. Resins of polyphenylene ethers are characterized by a unique combination of chemical, physical and electrical properties. For instance, they have favorable heat deflection temperatures and generally display high impact strengths. As a result of this unique combination of properties, resins of polyphenylene ethers are suitable for a broad range of commercial applications.

Typically, polyphenylene ethers are prepared via the oxidative coupling of phenols in the presence of a catalyst, and the oxidative coupling is carried out in an organic solvent such as toluene. Subsequent to polymerizing, solid polymer is isolated by precipitation with non-solvents like methanol. However, the typical oxidative coupling method is not very favorable, since among other reasons, it requires the use of large quantities of environmentally unfriendly solvents which must be recovered and purified by expensive and time consuming process steps.

It is of increasing interest to prepare polyphenylene ethers by a method which does not, for instance, require the use of solvents.

The instant invention, therefore, is directed to a novel method for making polyarylene ethers without requiring the use of solvents.

DESCRIPTION OF THE PRIOR ART

Efforts have been disclosed for preparing polyphenylene ethers. In U.S. Pat. No. 3,306,875, the disclosure of which is incorporated herein by reference, poly-(2,6-dimethyl-1,4-phenylene)-ether was prepared by reacting 2,6-dimethylphenol and CuCl in an organic solvent.

Still other investigators have made efforts for preparing polyphenylene ethers. In U.S. Pat. No. 4,028,341, the disclosure of which is incorporated herein by reference, polyphenylene ethers are prepared by reacting phenolic monomers, oxygen gas and copper catalysts in organic solvents.

SUMMARY OF THE INVENTION

The instant invention is directed to a novel method for making polyarylene ethers, said method comprises the step of melt polymerizing in the absence of solvents hydroxyaromatic monomers in the presence of:

(a) an oxidative coupling catalyst; and
(b) oxygen.

DETAILED DESCRIPTION OF THE PREFERRED EMBODIMENTS

In the instant invention, the preferred hydroxyaromatic monomers are phenolic monomers represented by the formula

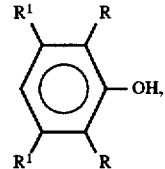

wherein each R is independently a halogen, $C_{1-10}$ alkyl group, aryl group, haloalkyl, aminoalkyl, hydrocarbonoxy, or halohydrocarbonoxy having at least 2 carbon atoms separating the halogen and oxygen atoms.

Each $R^1$ is independently a hydrogen, halogen, $C_{1-10}$ alkyl group, aryl group, haloalkyl, hydrocarbonoxy or halohydrocarbonoxy as defined for R. It is often preferred, however, that the phenolic monomers represented by formula I are 2,6-dimethylphenol or 2,3,6-trimethylphenol.

There is no limitation with respect to the catalyst employed in the instant invention, in fact, any conventional oxidative coupling catalyst known in the art may be employed and they often include those having a metal portion and an amine portion. Illustrative examples of such catalysts include those containing a copper compound and described in U.S. Pat. Nos. 3,306,874, 3,306,875, 3,914,266 and 4,028,341, the disclosures of which are incorporated herein by reference. These catalysts containing copper compounds are usually combinations of cuprous or cupric ions, halide and at least one amine. Often preferred copper containing catalysts include CuBr/dibutylamine and CuBr/N,N'-di-tert-butyl-1,2-ethylenediamine (DBEDA) as well as mixtures prepared therefrom.

Additional catalyst systems that may be employed in this invention include those containing manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkenediamines, o-hydroxyaromatic aldehydes, o-hydroxyazo compounds and α-hydroxyoximes.

When preparing polyarylene ethers like polyphenylene ethers via melt polymerization as described in this invention, catalyst stability/activity can decrease as temperatures are increased during the course of the reaction. The increase in temperature is often necessary to offset the increase in melt viscosity that occurs as molecular weight builds. Analysis of resulting off-gases from phenolic monomer polymerization reactions indicates the presence of amines. Often, replenishing of amine yields some renewed catalyst activity; however, it is less than expected and results in a large amount of amine usage.

To this end, high boiling point amine catalysts are often preferred either initially or when the molecular weight of the desired polymer builds and reaction temperatures are increased. Such high boiling point catalysts which may be employed in this invention include those having a metal portion in combination with tertiary amines like trialkylamines including tributylamine (TBA), tripentylamine (TPA), N,N-dimethylbutylamine (DMBA) and N,N-dimethyloctylamine (DMOA) as well as mixtures prepared therefrom, wherein mixtures are meant to include combinations of tertiary amines and tertiary amines with secondary amines, including mono- and diamines.

Additionally, high boiling point secondary amines may sometimes be preferred and they include higher molecular weight dialkylamines wherein the higher molecular weight dialkylamines are defined herein to mean those with each alkyl group independently being greater than about 4 carbon atoms. Illustrative examples include dibutylamine, dipentylamine and N,N-butylpentylamine.

The often preferred mixtures employed in this invention are those comprising at least one tertiary amine and at least one secondary amine. Illustrative examples include mixtures comprising TBA or DMOA, and DBEDA.

When high boiling point amine catalyst mixtures are employed, there is essentially no limitation to the proportion of secondary and tertiary amines employed. Often, however, greater than about 10% and preferably greater than about 25% and most preferably greater than about 40% of the total weight of catalyst (metal portion and amine portion) is tertiary amine.

The instant novel method reveals many new and unexpected results which include the discovery that no organic solvents/anti-solvents are required to produce polyphenylene ethers since said polyphenylene ethers may be prepared via melt polymerization.

As previously stated, the novel method comprises the step of melt polymerizing hydroxyaromatic monomers in the presence of a catalyst and oxygen. There is no limitation with respect to the order in which the reactants and catalyst are added. Often, however, the amine portion of the catalyst and phenolic monomers are mixed and heated to produce a melt. The melt may be stirred to homogeneity and additional catalyst components may be added thereafter. The temperature at which the instant invention may be carried out is essentially only limited to what is required to: (1) keep the monomers (and subsequently the resulting reaction mixture of monomers, oligomers and polymers) molten; and (2) assure that the catalysts are not destroyed. The temperature of the melt is often from about 30° C. to about 150° C. and preferably from about 35° C. to about 120° C. and most preferably from about 35° C. to about 100° C., including all ranges subsumed therein.

There is essentially no limitation with respect to the pressure (oxygen pressure) at which the instant invention may be carried out, other than that the pressure is limited only to the extent that polymerization can occur and is often from about atmospheric pressure to about 5,000 psig and preferably from about 100 psig to about 2,000 psig and most preferably from about 200 psig to about 1,000 psig, including all ranges subsumed therein. Moreover, as set out in Example 7 below, pressure increases can result in an increase in polymerization.

The amount of oxidative coupling catalyst employed in this invention is not limited and varies with respect to the metal portion and the amine portion. The metal portion is often about 0.02 mole percent to about 5.0 mole percent and preferably about 0.5 mole percent to about 3.0 mole percent and most preferably from about 0.1 mole percent to about 1.0 mole percent based on total moles of phenolic monomers employed.

The amine portion of the oxidative coupling catalyst is often about 1.0 mole percent to about 10.0 mole percent and preferably about 1.0 mole percent to about 8.0 mole percent and most preferably from about 2.0 to 4.0 mole percent based on total moles of the hydroxyaromatic monomers employed.

There is no limitation with respect to the apparatus which may be employed. In fact any apparatus with a gas inlet, heating and cooling capability and stirring capability may be employed. Often, cylindrical round bottom glass reactors and pressure reactors are used.

Oxygen is introduced into the melt, and a reaction mixture is produced which is preferably stirred to maximize polymerization. The viscosity of the reaction mixture gradually increases indicating polymer formation; however, the viscosity does not increase to the point of preventing stirring until the polymerization is complete. Subsequent to polymerization of substantially all monomer, the reaction mixture is cooled to produce a reaction product and polymer is obtained therefrom. Further, it is within the scope of the instant invention to include phase transfer catalysts and dilute the reaction product with solvents in order to recover polymers according to their respective molecular weights. Moreover, the molecular weights of the product obtained may vary in accordance with the equipment employed since greater mixing capabilities result in the formation of higher molecular weight polymer.

There is no limitation with respect to how the stirring of the reagents employed in this invention can take place. For instance, a magnetic or paddle stirrer may be employed. In a preferred embodiment, however, vigorous stirring is desired. This is true since vigorous stirring can increase the interfacial area between any oxygen present and the melt. In doing so, it has been found that the rate of oxygen transport into the melt increased, yielding improved polymerization.

The vigorous stirring described above can be achieved by most stirring mechanisms, and is often achieved by, for example, a high shear stirrer, extruder or homogenizer. Vigorous stirring, as used herein, is defined to mean any form of mechanical mixing capable of generating gas bubbles having a diameter less than about 1.0 mm and preferably less than about 0.5 mm and most preferably less than about 0.1 mm.

In regard to secondary products such as 3,3', 5,5'-tetramethyl-4, 4-diphenoquinone (TMDQ) produced via the instant method, the production of such may be minimized by the techniques known to those skilled in art which include controlling, for instance, concentrations as well as reaction temperature. Surprisingly, however, it has been unexpectedly discovered that vigorous stirring often results in less secondary product formation, even at temperatures which traditionally enhance their formation.

The polymers obtained via the instant novel method, both homopolymer and copolymer polyphenylene ethers are included since it is within the scope of this invention to employ any viable mixture of phenolic monomers as represented by the formula above. Typical homopolymers obtained are those which contain, for example, 2,6-dimethyl-1,4-phenylene ether units. Typical copolymers obtained include, for example, random copolymers containing such units in combination with 2,3,6-trimethyl-1,4-phenylene ether units. Often, the polymers obtained are characterized by their 3,5-dimethyl-4-hydroxyphenyl head end groups and their 2,6-dimethylphenoxy tail end groups.

Moreover, it is noted herein that the polyphenylene ethers produced via the instant invention can be blended with, for instance, high impact polystyrenes, polyamides and/or polyesters. Such blending is disclosed, for example, in U.S. Pat. Nos. 4,866,130, 4,826,933 and 5,091,472, the disclosures of which are incorporated herein by reference.

It is further noted herein that the polyphenylene ethers obtained may be functionalized via any conventional methods known to those skilled in the art. Such methods include those which employ chlorotriazines and polymerizable olefinic compounds and they are described, for example, in U.S. Pat. Nos. 5,115,043 and 4,994,525, the disclosures of which are incorporated herein by reference.

The following examples further illustrate and facilitate the understanding of the above-described novel process. The products obtained may be confirmed by conventional techniques such as proton and carbon-13 nuclear magnetic resonance spectroscopy, infrared spectroscopy and GPC analysis.

EXAMPLE 1

A cylindrical round bottom glass reactor immersed in a heated water bath and equipped with stirrer, oxygen inlet tube and thermometer was charged with 48.8 g (0.40 m) 2,6-xylenol and CuBr/N,N'-di-tert-butyl-1,2-ethylenediamine (DBEDA)/N-N-dimethylbutylamine (DMBA)/di(n-butyl)amine (DBA) 0.137 mL of CuBr solution prepared from 0.118 g of cuprous oxide in 1.0 mL concentrated HBr (0.22 mmol Cu), 0.077 g (0.45 mmol) DBEDA, 0.874 g (8.65 mmol) (DMBA) and 0.49 g (3.8 mmol) DBA to produce a mixture. The mixture was heated enough to melt the 2,6-xylenol and produce a reaction mixture to which 0.024 g (0.052 mmol) of methyl tricapryl ammonium chloride were added. The temperature of the reaction mixture was increased to about 50° C. and it was stirred vigorously while oxygen was bubbled in. After the first hour, the temperature of the reaction mixture was decreased to 40° C. and maintained for an 18 hour period. During the time the reaction mixture became a viscous liquid and eventually a very viscous reaction product. The reaction product was analyzed via GPC analysis which indicated the formation of 46 g (about 95% yield) polyphenylene ether.

EXAMPLE 2

Example 2 was prepared in a manner similar to the one described in Example 1 except that the concentrations of cuprous bromide, DBEDA and DMBA were doubled and DBA was not employed and the reaction time was 100 hours. The reaction product was analyzed via GPC analysis and 46 g (about 95% yield) of polyphenylene ether were recovered.

EXAMPLE 3

Example 3 was prepared in a manner similar to the one described in Example 2 except that a commercial mixing bowl was employed in lieu of a round bottom glass reactor, 50 g of 2,6-xylenol were used and the reaction time was 18 hours and the temperature was 60° C. 42 g (about 85%) of polyphenylene ether were recovered.

EXAMPLE 4

Example 4 was prepared in a manner similar to the one described in Examples 1 and 2 except that 80 mmol of DBA were employed and DBEDA and DMBA were not used. The reaction time was 48 hours and 46 g (about 95% yield) of polyphenylene ether were recovered.

EXAMPLE 5

A 300 mL pressure reactor with stirrer, oxygen inlet and seal was charged with 122 grams of 2,6-xylenol and catalyst CuBr/N,N'-di-tert-butyl-1,2-ethylenediamine (DBEDA)/di-N-butyl)amine DBA (prepared from mixing 5.2 grams DBA, 1.7 grams DBEDA, 2.6 mL copper solution prepared from 1.2 grams of $Cu_2O$ dissolved overnight in 9.8 mL of 48% HBr solution) producing a mixture. The mixture was heated to about 65° C. to melt the 2,6-xylenol and subsequently stirred. 200 psig of oxygen was charged to the reactor and the pressure was maintained/recharged from lows of about 20 psig to 160 psig. After 4.5 hours, the melt polymerization was stopped and a sample of the resulting polymer was dissolved in deuterated chloroform and then quenched with the sodium salt of nitrilotriacetic acid for NMR analysis. Analysis indicated that about 108 grams of polymer, polyphenylene ether, were recovered (about 90% yield).

EXAMPLE 6

Examples 6 was conducted in a manner similar to the one described in Example 5 except that the reaction was run for 4 hours and the pressure from the oxygen supplied was 400 psig (oxygen was recharged/maintained at 400 psig from lows of 280 to 380 psig). The polymer recovered, polyphenylene ether, was inhomogeneous and the yield was 94±4%.

EXAMPLE 7

Example 7 was conducted in a manner similar to those described in Examples 5 and 6 except that the pressure was atmospheric, a glass reactor was employed and 10% less copper was used in the catalyst. The resulting polymer, polyphenylene ether, was about 70% yield confirming that elevated pressure increases reaction rate.

EXAMPLE 8

A 300 mL round bottom pressure reactor equipped with stirrer, thermometer and oxygen inlet was charged with 3.7 g (20 mmol) TBA, 0.182 g (1.0 mmol) DBEDA, 61 g (500 mmol) molten 2,6-xylenol. The contents were stirred and oxygen was passed through at 0.3 standard cubic feet/hour and 0.596 ml (1.0 mmol) of a copper solution (prepared from 1.2 g cuprous oxide in 9.8 ml of 48% hydrobromic acid) was added. The resulting reaction mixture was dark brown in color and was allowed to run for about 4 hours at about 43° C. via water bath. It was periodically sampled by removing 0.1 mL which were subsequently diluted with about 2 to 3 mL of deuterochloroform and quenched with several drops of a 30% aqueous solution of trisodium nitrilotriacetate. GPC and proton NMR analysis of the samples indicated about 43.3 g (about 71% yield) of polyphenylene ether were produced.

EXAMPLE 9

Example 9 was conducted in a manner similar to the one described in Example 8 except that the weight of catalyst to monomer employed was 15:1 in lieu of about 23:1 and the catalyst used was a Cu/DBEDA/DMBA/DBA catalyst (weight ratio about 1/2/38/19 to 1/3/38/17 at 4 hours and 1/2.3/25/11 at 6.3 hours) in lieu of a TBA/DBEDA catalyst. After 3 hours, about 48% of the monomer was converted to polymer and after 6 hours, about 60% of the monomer was converted to polymer.

EXAMPLE 10

Example 10 was conducted in a manner similar to the one described in Example 8 except that 2,6-xylenol was added over 75 minutes in lieu of all at once. After 3 hours, about 66% of the monomer converted to polymer and after 6 hours, about 89% of the monomer converted to polymer with only about 1.0% TMDQ produced.

EXAMPLES 11–16

Examples 11–16 were conducted in a manner similar to the one described in Example 8 except that the ratio of monomer to catalyst varied and the amount of TBA varied. The results are compiled in the table and they show that when tertiary amines are employed, monomer conversion to polymer increases.

Table

| Example | Composition of catalyst (mmol) Cu/DBEDA/TBA | Monomer (mmol) | % Conversion to polymer |
|---|---|---|---|
| 11 | 1/1/80 | 1,000 | 67 |
| 12 | 1/1/40 | 1,000 | 66 |
| 13 | 1/1/20 | 1,000 | 64 |
| 14 | 1/1/10 | 250 | 71 |
| 15 | 1/1/40 | 1,000 | 60 |
| 16 | 1/1/80 | 2,000 | 43 |

EXAMPLE 17

An upright cylindrical glass reaction vessel equipped with a thermometer, fritted glass plate at the bottom for oxygen passage and a homogenizer head positioned 5 mm above the fritted glass plate was charged with catalyst of 1 part cuprous bromide, 1 part DBEDA, 20 parts TBA, and 500 parts of 2,6-xylenol monomer, all parts based on parts of copper, [1.79 ml (3 mmol Cu) of a copper solution prepared by dissolving 1.2 g cuprous oxide (95%) into 9.8 mL (48%) hydrobromic acid, 0.54 g (3 mmol) DBEDA, 11.1 g (60 mmol) tributylamine, 183 g (1.5 mol) pure 2,6-xylenol]. The resulting mixture was stirred vigorously with the homogenizer and oxygen was passed through at 1.0 standard cubic feet per hour yielding a reaction mixture. The reaction mixture was initially maintained at a temperature of 50° C. and ice water cooling and heated water baths were used to regulate temperature. Within about 8 minutes, the reaction leveled off and a temperature of about 70° C. was maintained for about an hour. Subsequently, the reaction temperature was gradually increased to 100° C. over the next 50 minutes.

The reaction mixture was sampled periodically by removing 0.2 mL portions, diluting the samples with deuterochloroform (2-3 mL), quenching with several drops of a 30% aqueous solution of trisodium nitrilotriacetate, and analyzing via NMR and GPC. Analysis indicated polyphenylene ether (about 80% yield) and TMDQ about 1.1% yield was measured was measured.

EXAMPLE 18

Example 18 was conducted in a manner similar to the one described in Example 17 and 20 except that the initial oxygen flow rate was 2.0 standard cubic feet per hour (SCFH), after 2 minutes increased to 3.0 (SCFH), and after 6 minutes lowered to 2.0 SCFH, after 7 minutes lowered to 1.5 SCFH and finally 1.0 SCFH after 11 minutes. After 25 minutes the temperature was 90° C., after 30 minutes 150° C. and after 35 minutes 190° C. The reaction was carried out for about 35 minutes. % yield polyphenylene ether was about 90% with only about 0.34% TMDQ was measured.

EXAMPLE 19

Example 19 was conducted in a manner similar to the one described in Example 17 except that the catalyst ratio was 1 part cuprous bromide, 1 part DBEDA, 80 parts TBA and 2000 parts 2,6-xylenol, based on parts per copper and the temperature was held at 55° C. for 1 hour and then raised to 99° C. After about 135 minutes, the reaction was stopped and polyphenylene ether was recovered in about 70% yield.

EXAMPLE 20

Example 20 was prepared in a manner similar to the one described in Example 19 except that a paddle stirrer was employed in lieu of a homogenizer (vigorous stirrer). At about the same reaction times the polyphenylene ether was recovered in 36% yield indicating that vigorous stirring can result in increased yield.

EXAMPLE 21

An upright cylindrical glass reaction vessel containing a fritted glass plate at the bottom through which oxygen is passed was equipped with a thermometer and a cylindrical homogenizer head positioned above the fritted glass plate. The vessel was charged with 168 g (1385 mmol) of molten 2,3,6-trimethylphenol, 13.2 mL (55.4 mmol) TBA, and 0.30 mL (0.14 mmol) DBEDA. The resulting mixture was stirred vigorously with the homogenizer while oxygen was bubbled through the mixture at 1.0 SCFH. To the resulting reaction mixture was added 0.82 mL (0.14 mmol copper) of a catalyst solution prepared by the dissolution of 1.2 g cuprous oxide (95%) and 9.8 mL (48%) hydrobromic acid. The reaction was initiated at a temperature of 70° C. by subjecting the reaction vessel to an ice or warm water bath. After about one hour, the temperature was increased to 100° C. and held at this temperature until polymerization was complete (70% monomer conversion). At this point, the contents in the vessel were poured into a blender containing 1000 mL methanol and 10 mL glacial acetic acid to recover homopolymer (Mw=600) derived from 2,3,6-trimethylphenol monomer.

EXAMPLE 22

Example 22 was conducted in a manner similar to the one described in Example 21 except that copolymer was produced by charging the reaction vessel with 90.8 g (744 mmol) 2,6-xylenol and 101.9 g (744 mmol) 2,3,6-trimethylphenol after about 76% monomer conversion, the copolymer produced and isolated had a Mw of about 1000.

What is claimed is:

1. A method for making polyarylene ethers, said method comprises the step of melt polymerizing at a temperature from about 30° C. to about 120° C. and in the absence of solvents hydroxyaromatic monomers in the presence of:

(a) an oxidative coupling catalyst; and (b) oxygen.

2. A method for making polyarylene ethers in accordance with claim 1 wherein said polyarylene ethers are polyphenylene ethers and hydroxyaromatic monomers are phenolic monomers represented by the formula

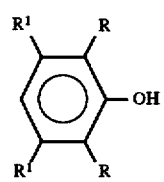

wherein each R is independently a halogen, $C_{1-10}$ alkyl group, aryl group, haloalkyl, aminoalkyl, hydrocarbonoxy or halohydrocarbonoxy having at least 2 carbon atoms separating the halogen and oxygen atoms and each $R^1$ is independently a hydrogen, halogen, $C_{1-10}$ alkyl group, aryl group, haloalkyl, hydrocarbonoxy or halohydrocarbonoxy as previously defined.

3. A method for making polyarylene ethers in accordance with claim 1 wherein said oxidative coupling catalyst comprises copper or manganese.

4. A method for making polyarylene ethers in accordance with claim 3 wherein said oxidative coupling catalyst comprises a metal portion and an amine portion and is CuBr/dibutylamine, CuBr/N, N-di-tert-butyl-1,2-ethylenediamine or a mixture prepared therefrom.

5. A method for making polyarylene ethers in accordance with claim 4 wherein said metal portion is about 0.02 mole percent to about 5.0 mole percent and said amine portion is from about 1.0 mole percent to about 10.0 mole percent based on total moles of hydroxyaromatic monomers employed.

6. A method for making polyarylene ethers in accordance with claim 2 wherein said polyphenylene ethers are homopolymers comprising 2,6-dimethyl-1,4-phenylene ether units.

7. A method for making polyarylene ethers in accordance with claim 2 wherein said polyphenylene ethers are copolymers of 2,6-dimethyl-1,4-phenylene ether units and 2,3,6-trimethyl-1,4-phenylene ether units.

8. A method for making polyarylene ethers in accordance with claim 1 wherein the melt polymerization of hydroxyaromatic monomers occurs at a pressure from about atmospheric pressure to about 5,000 psig.

9. A method for making polyarylene ethers in accordance with claim 1 wherein the melt polymerization of hydroxyaromatic monomers occurs while stirring said hydroxyaromatic monomers, oxidative coupling catalyst and oxygen.

10. A method for making polyarylene ether in accordance with claim 9 wherein said stirring is vigorous stirring capable of generating gas bubbles having a diameter less than about 1.0 mm.

11. A method for making polyarylene ethers in accordance with claim 9 wherein said stirring is accomplished with a magnetic or paddle stirrer.

12. A method for making polyarylene ethers in accordance with claim 10 wherein said vigorous stirring is accomplished with a high shear stirrer, extruder or homogenizer.

13. A method for making polyarylene ethers in accordance with claim 1 wherein said oxidative coupling catalyst has a metal portion in combination with a tertiary amine or a metal portion in combination with a mixture having a tertiary amine and secondary amine.

14. A method for producing polyarylene ethers in accordance with claim 13 wherein said metal portion is a copper portion, said tertiary amine is TBA, TPA, DMBA or DMDA and said secondary amine is DBEDA or DBA.

* * * * *